Aug. 13, 1946.  A. F. ANJESKEY  2,405,544
METHOD OF ASSEMBLING AIRPLANES AND THE LIKE
Filed March 16, 1943  3 Sheets-Sheet 1
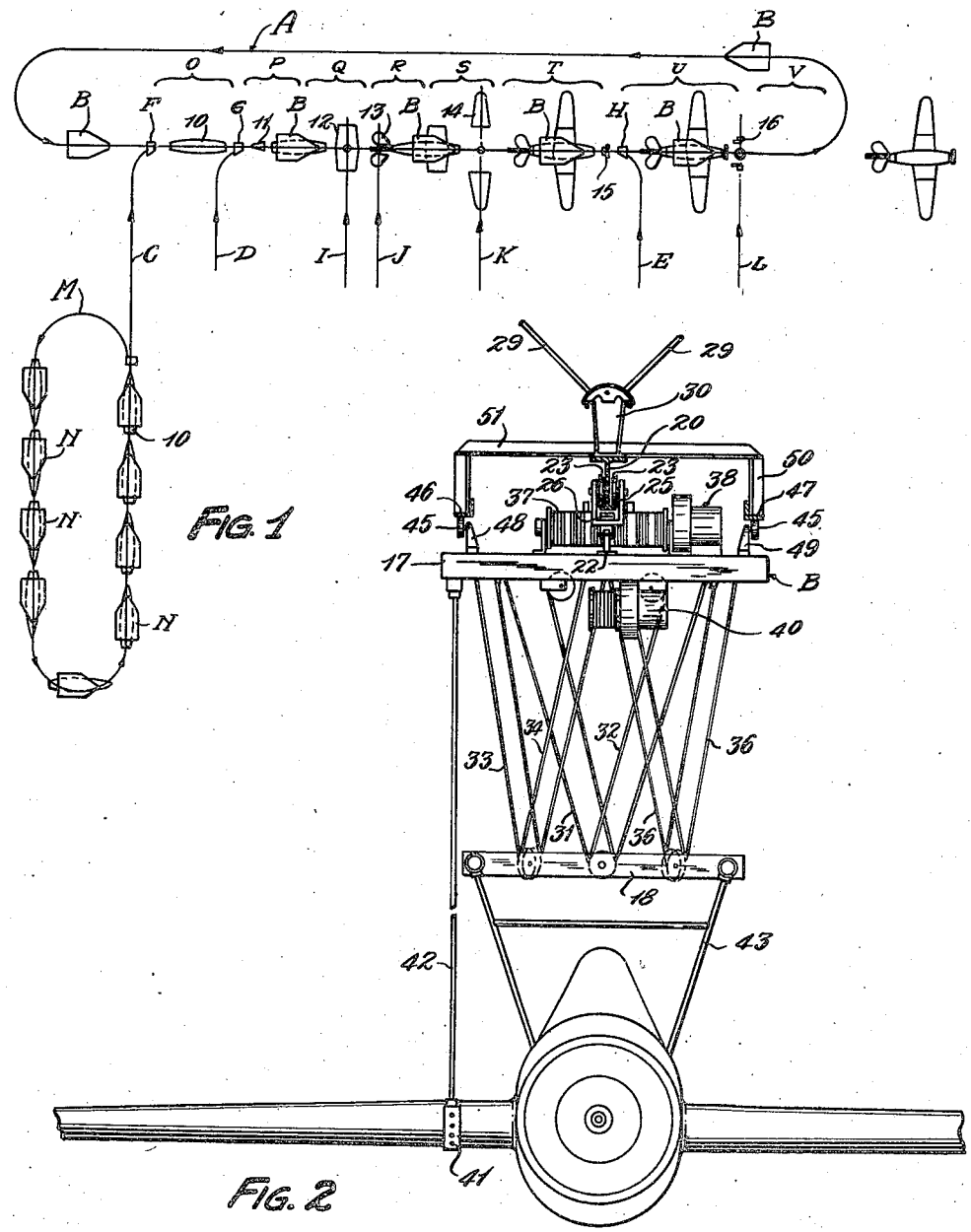
INVENTOR.
ALPHONSE F. ANJESKEY
BY
Kwis Hudson & Kent
ATTORNEYS Aug. 13, 1946.  A. F. ANJESKEY  2,405,544
METHOD OF ASSEMBLING AIRPLANES AND THE LIKE
Filed March 16, 1943  3 Sheets-Sheet 2

INVENTOR.
ALPHONSE F. ANJESKEY
BY
Kwis Hudson & Kent
ATTORNEYS

Aug. 13, 1946.   A. F. ANJESKEY   2,405,544
METHOD OF ASSEMBLING AIRPLANES AND THE LIKE
Filed March 16, 1943   3 Sheets-Sheet 3

INVENTOR.
ALPHONSE F. ANJESKEY
BY
Kwis Hudson & Kent
ATTORNEYS

Patented Aug. 13, 1946

2,405,544

UNITED STATES PATENT OFFICE 2,405,544

METHOD OF ASSEMBLING AIRPLANES AND THE LIKE

Alphonse F. Anjeskey, Cleveland, Ohio, assignor to The Cleveland Crane & Engineering Company, Wickliffe, Ohio, a corporation of Ohio Application March 16, 1943, Serial No. 479,316

2 Claims. (Cl. 29—148.2)

The present invention relates to a method of manufacturing, assembling or handling during manufacture or assembly comparatively large, bulky devices particularly airplanes and the like.

The manufacture of airplanes and the like, prior to the present invention, has been accomplished by so-called hand methods. Starting with the frame member fuselage, which was generally placed either on a pair of "horses" or caster dollies, the workmen assembled the various parts therewith as best they could. Because the height of the frame or fuselage could not be easily varied, naturally, positions best suited for efficient work could not be assumed by the workmen. The unnatural positions assumed by the workmen not only were fatiguing and irritating but were dangerous, as any misstep or the accidental dropping of a part could readily result in injury, lost time, etc. The methods employed also tended to carelessness and defective workmanship which might result in loss of life when the plane was flown or the device used.

The principal object of the invention is the provision of a novel and improved method of manufacturing including assembling or handling during manufacture comparatively large, bulky devices, such as, devices particularly airplanes and the like wherein the airplane or desired device is moved either continuously or intermittently along an assembly line by movable overhead support including means for raising or lowering the airplane or other device while maintaining it stable, that is free from sway thus overcoming many of the disadvantages of the prior method of manufacturing mentioned above.

Among other things, the invention resides in performing manufacturing operations in certain ways and further objects and advantages thereof will be apparent to those skilled in the art to which the invention relates from the following description of the preferred method of practicing the invention described with reference to the accompanying drawings forming a part of this specification in which similar reference characters designate corresponding parts and in which Fig. 1 is a diagrammatic view of an apparatus embodying the present invention;

Fig. 2 is a view approximately on the line 2—2 of Fig. 3;

Figure 3:
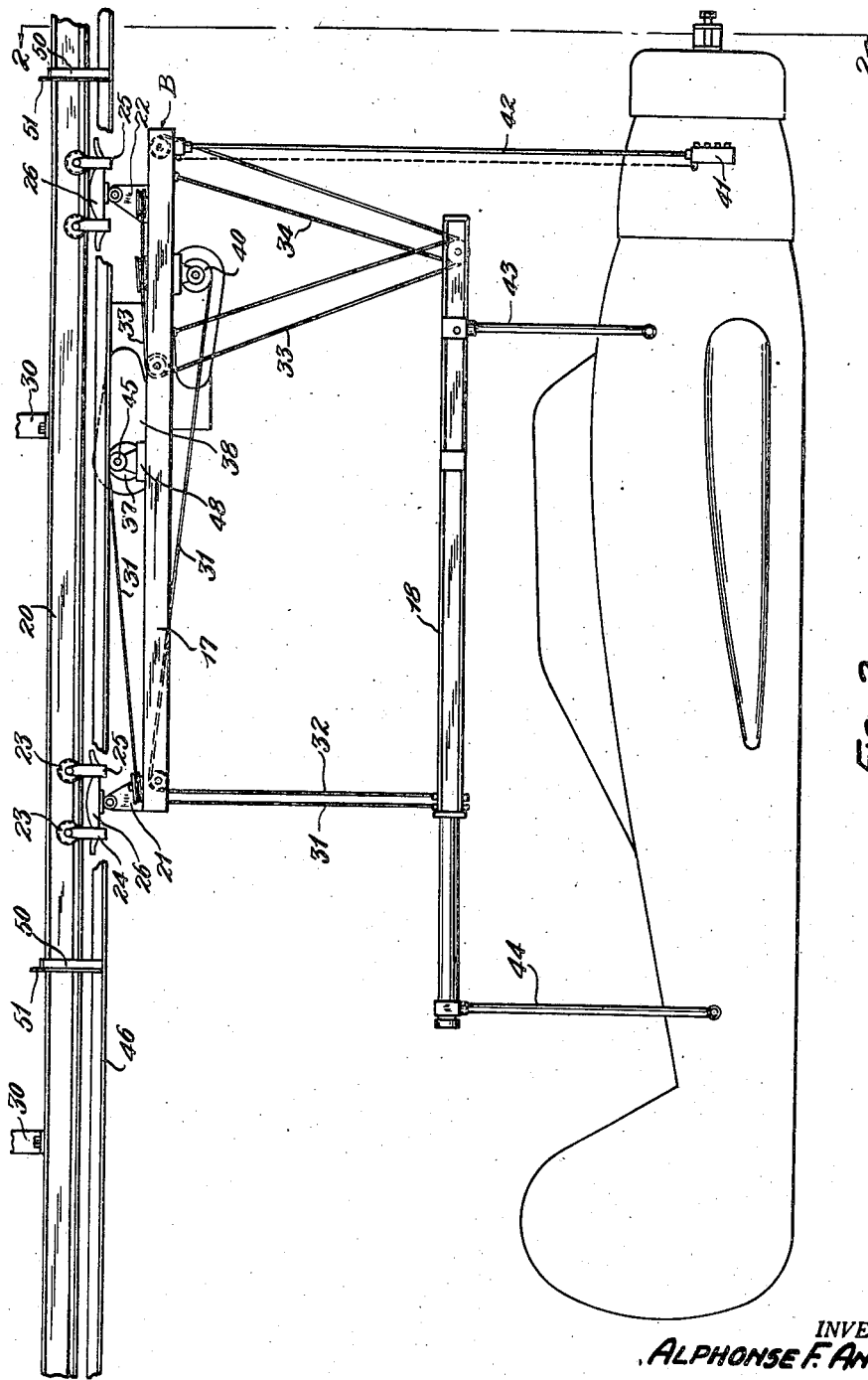
Fig. 3 is a side elevational view of a portion of the apparatus shown in Fig. 1.

According to the method of the present invention, the device to be assembled, in the present instance an airplane is moved along an assembly line comprising a plurality of working stations by a movable overhead device, including hoist mechanism for varying the height of the airplane above the floor and/or for tilting the same so as to obtain the proper working height, etc., for performing the various operations, and means for maintaining the airplane stable, that is, free from sway. The movement of the airplane along the assembly line eliminates the necessity of the workmen lugging their tools, etc., from airplane to airplane, and the fact that the airplane can be tilted and the height thereof above the floor readily varied eliminates much of the climbing and allows the workmen to assume more natural and advantageous positions while performing the various operations. The fact that the airplane is stabilized permits workmen to climb or walk thereon without danger and without interfering with others working thereabout. It also permits ladders and the like to be placed against the plane.

While the method of the present invention may be performed by different apparatus it is herein illustrated and described with reference to a stabilized overhead monorail underslung carrier system similar to that disclosed and claimed in my copending application Serial No. 479,315, filed March 16, 1943, upon which U. S. Patent No. 2,358,487 issued September 19, 1944. Referring to the drawings, Fig. 1 shows diagrammatically a stabilized overhead monorail carrier system comprising a closed loop designated generally by the reference character A about which a plurality of stabilized hoist carriers, designated generally by the reference character B, are adapted to travel. The monorail system shown also comprises a plurality of branch tracks designated generally by the reference characters C, D, and E connected to the loop A by transfer switches designated generally by the reference characters F, G and H respectively, and cross tracks I, J, K and L. The branch and cross tracks are for the purpose of feeding or bringing sub-assemblies etc. to the main assembly loop and communicate with either sub-assembly areas such as the overhead monorail carrier loop M shown in Fig. 1, or with storage areas.

Referring to the particular system shown, the main part of the fuselage or frame 10 of the airplane to be produced is assembled at the area serviced by the loop M and thereafter transferred to the main assembly loop A by the carriers N on the loop M, which carriers may be similar in construction to the carriers B, if desired. After being deposited by the carriers N at the station or zone designated by the reference character O, the fuselage 10 is picked up by one of the carriers B and carried through the succeeding zones or stations P, Q, R, S, T, and U, where the tail section 11, center wing section 12, rudder and stabilizer 13, outer wing sections 14, motor 15, and landing gear 16, respectively, are assembled with or attached to the main part of the fuselage. The completed airplane is discharged from the apparatus at station V and delivered at the right hand end of the loop A, as viewed in the drawings. The carrier is thereafter returned to the starting position.

Obviously any number of carriers may be employed and any number of airplanes may be in the process of assembly at the same time. It is also to be understood that operations other than those specifically referred to above, such as painting, etc., may be performed upon the airplane while suspended from the carrier, and the carriers may be moved either continuously or intermittently. Instead of transferring the fuselage from the carriers N to the carriers B at station O the carriers N could be made to travel about the loop A and means provided to return them to the loop M. Alternatively, the assembly work performed on the loop M could be performed on the loop A.

Referring to Figs. 2 and 3 particularly, it will be seen that the carriers B, which are all identical in construction, each comprises an upper frame 17 and a load member or lower frame 18. The upper frame 17 which constitutes a movable overhead support is suspended from an I-shaped carrier monorail 20 by trucks located at opposite ends of the frame 17 and connected thereto through the medium of brackets 21 and 22. Both trucks are identical in construction and the particular construction thereof is immaterial in so far as the present invention is concerned. Each truck shown comprises two pairs of flanged wheels 23 pivotally connected to yoke members 24 and 25 which in turn are connected to opposite ends of a load bar 26. The brackets 21 and 22 are welded to the upper frame or member 17 at its longitudinal center line and are pivotally connected to the load bars by horizontal pivot pins. The wheels 23 of each pair engage opposite horizontal lower flanges of the carrier rail 20. The carrier rail 20 is fixed to any suitable overhead support in any convenient manner as by the hanger rods 29 arranged to hold the rail stationary and eliminate side sway. The hanger rods 29 are secured to the rail 20 through the medium of a fixture 30.

The load member or lower frame 18 is suspended from the upper frame 17 by stabilized hoist mechanism, that is, mechanism which will raise or lower the load member 18 with respect to the upper frame 17 while maintaining the two members stable or, in other words, free from relative sway or pivotal movement. As shown, lower frame 18 is suspended from the upper frame 17 by three pairs of cables 31, 32; 33, 34; 35, 36; arranged in a manner similar to that disclosed in a copending application of Arthur L. Medenwald, Serial No. 516,206, upon which U. S. Patent No. 2,357,443 issued September 5, 1944. One end of each of the cables 33 to 36 inclusive is connected to the upper frame 17 while the other end thereof, together with one end of each of the cables 31 and 32, is connected to the drum 37 of a motor driven hoist mechanism designated generally by the reference character 38 through the medium of which the lower frame 18 may be raised or lowered. The ends of the cables 31 and 32 other than the ends connected to the drum 37 are connected to a motor driven drum 40 hereinafter referred to as the tilting drum, through the medium of which the lower frame 18 may be tilted about a horizontal axis. The cables 31 to 36 inclusive not only constitute suspension means but also serve as guy wires to maintain the lower frame 18 steady with respect to the upper frame 17. As shown, each cable is arranged in such manner that the vertical portions thereof form single tackles. However, it will be understood that any desired form of tackle may be employed. Alternatively other types of stabilized hoist mechanism may be employed for supporting the lower frame or load member from the carrier proper.

The construction and operation of the motor driven hoist and tilting mechanisms, per se, form no part of the present invention and will not be described in detail. Suffice it to say that they are adapted to be controlled from a pendant push button switch station, designated generally by the reference character 41, connected to the lower end of a tubular member 42 fixed to the upper frame 17. In the present instance the member 42 is a rigid member and provides means for hand-propelling the carrier B about the monorail track. Alternatively, the carriers may be motor driven.

The load, in the present instance an airplane, is rigidly supported from the lower frame 18 by members such as tubular frames 43 and 44 connected to the lower frame 18 and to the airplane in such a manner that the airplane is stabilized with respect to the lower frame or member 18. The members or frames 18, 43 and 44 constitute a fixture or jig for supporting or holding the airplane.

Because of the particular suspension employed to connect the upper frame 17 and the lower frame 18, the fixture or jig for the airplane is stabilized with respect to the upper frame or member 17. In other words, the construction produces an overhead stabilized hoist carrier, that is, an overhead carrier comprising a load member movable vertically with respect to the carrier proper by hoist mechanism but not free to pivot or sway relative thereto. Neither the lower frame 18 nor the airplane connected thereto will swing or sway relative to the upper frame 17 under usual conditions of operation, which, in the case of an airplane assembly line, contemplates an uneven or shifting load such as might be occasioned by assembling parts on one side of the plane in advance of similar parts on the other side, by workmen walking or climbing about the airplane, particularly about the outer ends of the wings, by placing ladders against the plane, etc. In order to complete the stabilization of the airplane, the carrier must be stable with respect to the trackway along which it moves. In the present instance the carrier is stabilized with respect to its trackway in the following manner.

Both the upper and the lower frames 17 and 18 as shown, are generally rectangular in shape and the upper frame 17 is provided with rollers 45 located on opposite sides of the longitudinal center line of the carrier and spaced a considerable distance therefrom. The rollers 45 are on the top of the frame 17 and engage the underside of members 46 and 47 located on opposite sides of the carrier rail 20. In the embodiment shown, the rollers 45 are carried by members 48 and 49 welded to and projecting above the upper frame 17 at opposite sides of the center line of the carrier and approximately midway of the length thereof. The members 46 and 47 are in the form of angle irons supported in fixed position with respect to the carrier rail 20 by being welded to vertical brackets 50 connected to opposite ends of cross-arms 51. The cross-arms 51 are in turn fixed to the upper flange of the carrier rail 20, as by being welded thereto. It is to be understood, however, that the members 46 and 47 which form a trackway paralleling the carrier rail 20 may be supported in any convenient manner so long as they are fixed with respect to the carrier rail. From the foregoing description it will be apparent that the upper frame 17 of the carrier cannot sway with respect to the carrier rail but must remain in a predetermined horizontal plane. Any tendency of the carrier to pivot about the carrier rail 20 is prevented by the engagement of the rollers 45 with the members 46 and/or 47.

The airplane is stabilized in a generally horizontal position even though supported from above and movable vertically to facilitate working thereon, etc. In the first place the airplane is fixedly connected to an overhead stabilized hoist carrier, that is, an overhead carrier having a load member not free to swing or pivot with respect to the carrier proper but which is movable vertically with respect to the carrier proper by hoist mechanism forming a part of the carrier and, in the second place, the carrier proper is stabilized with respect to its overhead track, thus completing the stabilization of the airplane.

Figure 4:
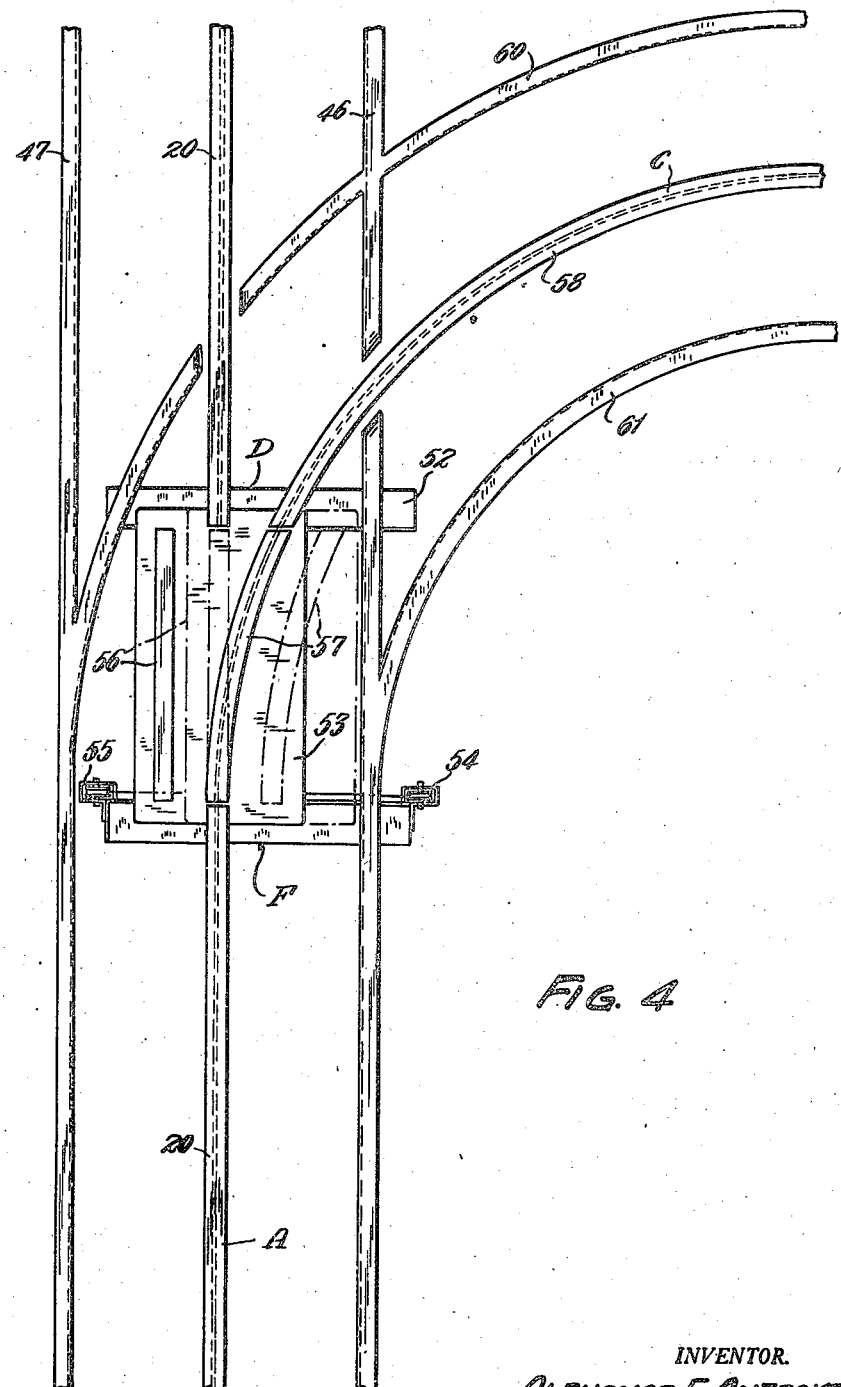
Fig. 4 is a bottom view of a portion of the apparatus shown in Fig. 1 including a transfer switch.

Referring to Fig. 4, which shows the preferred construction for connecting a branch track to the main loop A, the reference character F designates generally a sliding type switch. The switch for the most part is similar to commercial switches manufactured at the present time by The Cleveland Crane & Engineering Company. Suffice it to say that the switch shown comprises an outer or supporting frame 52 suspended in a suitable manner from the overhead structure to which the rail 20 is attached, and an inner or sliding frame 53 slidably supported on the frame 52 and adapted to be moved transversely of the rail 20 by operating chains connected thereto and passing over the pulleys 54 and 55. The inner or sliding frame 53 carries two sections of rail 56 and 57 the former of which is a straight section and the latter a curved section. When the inner or sliding frame 53 is in the position shown in Fig. 4, the curved section of track 57 of the switch aligns with the section of rail 20 shown at the lower part of the drawing and the rail 58 of the branch track C. When the inner or sliding frame 53 is moved to the position shown in dot-dash lines in Fig. 4 of the drawings, the straight section of rail 56 aligns with the two sections of rail 20 shown.

When the carrier B is on the branch track C the upper frame 17 thereof is stabilized with respect to the carrier rail 58 by members 60 and 61 similar to the members 46 and 47 and preferably supported from the carrier rail in a similar manner. It will be observed that it is not necessary to shift any part of either of the trackways for the rollers 45 when manipulating the switch F to transfer a carrier from one part of the system to another. Where the carrier rails 20 and 58 pass through the members 60 and 46 respectively, the latter members are merely interrupted. As shown, the bottom surfaces of the carrier rails 20 and 58 align with the bottom surfaces of the members 46, 47, 60 and 61. While a sliding type of switch has been shown, it will be understood that other types of switches may be employed, and that the switches may be either electric switches or manually operated switches.

As previously stated the carriers N may or may not be similar to the carriers B as desired. In the embodiment of the invention shown it is assumed that they are the same and that it is desirable to stabilize all of the carriers with respect to the carrier rails throughout the entire system, except for the return runs or reaches of the loops. If the carriers N or in fact any of the carriers on the branch or cross tracks are not to be stabilized with respect to their carrier rail, they would not embody guide or stabilizing means such as the rollers 45 and the trackways therefor. For the most part the remarks previously made with respect to the branch or feeder track C apply to the other branch or feeder tracks including the cross tracks. Attention is called to the fact that carriers on the branch tracks can be moved through the medium of the transverse switches onto the track or carrier rail of the main loop. For example a carrier on the branch or feeder track E carrying the motor 15 can be moved onto the carrier track of the main loop A and the motor thereafter readily moved longitudinally of the airplane, thus facilitating assembly of the motor with the fuselage. In order to align the mountings one or the other of the parts can be raised, lowered, and/or tilted as required.

From the foregoing description of the preferred embodiment of the invention it will be apparent that the objects heretofore enumerated and others have been accomplished and that the present invention provides a new and improved method of and apparatus for manufacturing or assembling relatively large heavy devices particularly airplanes and the like. An overhead monorail underslung carrier system has been selected as the preferred apparatus for practicing the method of the present invention because of this type of system, that is, the ease with which the runways can be directed or located as desired, and the ease with which carriers can be shifted from one track or part of the system to another and otherwise moved thereabout. While the preferred embodiment of the invention has been herein shown and described in considerable detail, it is to be understood that the invention is not limited to the particular construction shown nor is it limited to the assembly of airplanes or airplane parts, and it is my intention to hereby cover all adaptations and arrangements and uses thereof which come within the practice of those skilled in the art to which the invention relates.

In the appended claims, when two or more elements or members, etc., are referred to as being "stabilized" with respect to each other or to another element, it is meant that the parts referred to are not free to pivot or sway relative to each other, and when the phrase "stabilized hoist carrier" is used, it means a carrier movable along a runway and having a load member, that is, a member adapted to have a load supported thereby that is not free to pivot or sway with respect to the other parts of the carrier proper, but vertically movable by hoist mechanism incorporated in the carrier.

Having thus described my invention, I claim:

1. The method of manufacturing or handling during manufacture a comparatively large bulky device such as an airplane, which comprises supporting entirely from overhead a part of the device to be manufactured for horizontal movement over a portion of a floor area adapted to be occupied by workmen by connecting the same to an overhead carrier, moving said part horizontally over a portion of said floor area by moving said carrier, maintaining said part free from sway in all directions by overhead means during a portion of its movement over said area, supporting from overhead a second part of the device to be manufactured for horizontal movement over a portion of said floor area by connecting the same to a second overhead carrier, bringing said parts together while so supported, varying the relative height of the parts to align the same above said floor area by effecting movement between various parts of one of the carriers, and connecting said parts together.

2. The method of manufacturing or handling during manufacture a comparatively large bulky device such as an airplane, which comprises supporting entirely from overhead a part of the device to be manufactured for horizontal movement over a floor area adapted to be occupied by workmen by connecting the same to an overhead carrier, moving said part horizontally while so supported over a portion of said floor area by moving said carrier, holding said part free from sway in all directions by overhead guy means during a portion of its travel over said area, supporting from overhead a second part of the device to be manufactured for horizontal movement over a portion of said floor area by connecting the same to a second overhead carrier, moving said second part horizontally over a portion of said area by moving the second carrier, holding said second part free from sway in all directions by overhead guy means during a portion of its travel over said area, bringing said parts together while so supported and maintained free from sway, varying the relative height of the parts to align the same above said floor area by effecting movement between various parts of one of the carriers and connecting said parts together.

ALPHONSE F. ANJESKEY.